(12) United States Patent
Juraschek

(10) Patent No.: US 6,412,963 B2
(45) Date of Patent: Jul. 2, 2002

(54) DEVICE FOR ADJUSTING THE POSITION OF A SIDE MIRROR

(76) Inventor: Peter Juraschek, Birkenweg 11, D-74385 Pleidelsheim (DE)

( * ) Notice: Subject to any disclaimer, the term of this patent is extended or adjusted under 35 U.S.C. 154(b) by 0 days.

(21) Appl. No.: 09/777,238

(22) Filed: Feb. 5, 2001

Related U.S. Application Data

(62) Division of application No. 09/194,888, filed as application No. PCT/DE97/01128 on May 30, 1997, now Pat. No. 6,234,637.

(30) Foreign Application Priority Data

Jun. 5, 1996 (DE) .......................... 196 23 885

(51) Int. Cl.⁷ .............................................. G02B 7/182
(52) U.S. Cl. ....................... 359/879; 359/871; 359/872; 359/873; 359/874
(58) Field of Search ................... 359/879, 871, 359/872, 873, 874, 876, 877, 838; 248/476, 477, 487, 488

(56) References Cited

U.S. PATENT DOCUMENTS 5,477,390 A * 12/1995 Boddy et al. ................ 359/841
5,719,713 A * 2/1998 Brown ........................ 359/843
5,984,483 A * 11/1999 Mazurek et al. ............. 359/872

* cited by examiner

Primary Examiner—Mohammad Sikder
(74) Attorney, Agent, or Firm—Clark Hill PLC

(57) ABSTRACT

The device according to the invention is characterized in that a toothed rack (7) is articulated to the mirror foot (2) into which a toothed wheel (6) engages which is moved by a drive (5) fastened to the mirror frame (1). The mirror frame (1) is also articulated to the mirror foot (2) via an intermediate joint (8) articulated via a second rotating axle (10) different from the first. A hooked spring (12) which locks the mirror frame (1) to the mirror foot (2) enables the mirror frame (1) to move between two predetermined positions. The mirror frame can be moved from any position thereof by the drive (5) into the two positions and between the two positions.

6 Claims, 4 Drawing Sheets

DEVICE FOR ADJUSTING THE POSITION OF A SIDE MIRROR

CROSS-REFERENCE TO RELATED APPLICATIONS

This application is a divisional of Ser. No. 09/194,888 filed on Sep. 21, 1999 U.S. Pat. No. 6,234,637 which is a 371 of PCT/DE97/01128 May 30, 1997, which claims priority to German application no. 196 23 885.4 filed on May 6, 1996.

BACKGROUND OF THE INVENTION

1. Field of the Invention

The invention relates to a device for adjusting the position of a side mirror for vehicles of all kinds.

2. Description of the Related Art

Such adjusting devices of manually, mechanically or also electrically driven manner are particularly used with motor vehicles, in order to move the side mirrors between different positions. In particular, the side mirrors are reciprocated by such devices between a predetermined, folded driving position and a parking position having the mirror surface applied against the vehicle.

So called two axis side mirrors usually have a mirror foot designed to be fixed to the vehicle and a mirror head movably fastened on the mirror foot, with the mirror head comprising a mirror frame, which for example carries the mirror surface member as well as a mechanically or electrically actuated adjusting mechanism thereof also for adjusting the angle of view related to the driver's sitting position.

An adjusting device having a mirror foot, a mirror frame and a toothed wheel mechanism, via which the mirror frame is moved relative to the mirror foot is disclosed in U.S. Pat. No. 5,477,390. The toothed wheel mechanism comprises a double armed supporting rod, which is rotatably articulated to the mirror foot and an arm thereof is formed as a toothed quadrant, and comprises an electric drive, which is designed to be fixed to the mirror frame and drives a toothed wheel engaging the toothed quadrant. The mirror frame is rotatably articulated to the end of the second arm of the supporting device. When the electric motor is now actuated, the toothed wheel rolls off on the toothed quadrant and the mirror frame is rotated about the axis of the articulation on the supporting rod.

The adjusting device disclosed in U.S. Pat. No. 5,477,390 further comprises a clock spring connecting the mirror foot and mirror frame and being strongly biased such that by virtue of the spring force the mirror frame is rotated about the axis of the rotatable articulation of the supporting device on the mirror foot, until projections fastened to the mirror frame engage into stops being respectively arranged on the mirror foot. Accordingly, the mirror is essentially retained by means of the tensile force of the clock spring in its predetermined positions such as in a folded parking position or a swung out driving position.

When a great external force such as an impact is exerted upon the mirror housing in the direction of motion of the vehicle, the tensile force of the spring is overcome and the mirror is folded about the articulation of the supporting rod on the mirror foot in the direction of motion into a safety position. However, the position of the toothed wheel does not change with it in relation to the toothed quadrant. Accordingly, it is disadvantageous with this adjusting device, that a motor-driven reset of the mirror housing from this overstretched position into the driving position is not enabled. The mirror head has to be manually restored, accordingly, from the safety position into the driving position and parking position respectively.

SUMMARY OF THE INVENTION

It is the object of the present invention to provide a device for adjusting the position of a side mirror for vehicles of all kinds, which enables the mirror also to restore from the overstretched position into a predetermined position by means of a drive.

By providing with the device according to the invention a joint rod as well as a toothed quadrant being rotatably articulated to the mirror foot, with the joint rod connecting the mirror frame and being articulated to a second rotational axis being different from the first rotational axis on the mirror foot, it is possible with the device according to the invention to drivingly restore the mirror from the position being overstretched in the driving direction into a predetermined position such as into the common folded driving position when in use.

Since with the device according to the invention a clock spring is no longer required, less expenditure of force is sufficient to move the mirror frame. Accordingly, a weak drive for example a weak electric motor is absolutely sufficient for the motion of the mirror frame, such that actuations of small construction, which are incorporable into small sized mirrors as well can also be used.

The same mirror construction, i.e. the same mirror foot and mirror frame can be used for side mirrors having a manual, mechanical or electric adjusting. Thereby the manufacturing requirement and piece cost are reduced.

By means of the toothed rack the drive can be fastened nearly to any place of the frame, such that an optimal positioning of the drive relative to the forces and dynamic effect used is advantageously enabled about half way to the mirror frame.

When the mirror frame is locked to the second rotational axis, so the motions of the mirror head between the first predetermined position and a second predetermined position is enabled without the locking to be released. This second predetermined position is for example the parking position, in which the mirror is folded against the vehicle such that the mirror surface member furthest possibly abuts against the vehicle. In this case, it is possible for the drive to reciprocate the mirror head between these two predetermined positions with only less expenditure of force, wherein a motion of the mirror into the safety position by virtue of strong external forces is possible, nevertheless, by overcoming the locking. It is possible for the drive, in particular, to move the mirror from this safety position again into a position between these two predetermined positions as well, and then to restore the locking.

When the drive is provided with an overload release, thus the drive is self-disengaging, when the mirror during motion from the driving position reaches the parking position having the mirror surface adjacent to the vehicle, or reaches the safety position of the mirror, which is overstretched into the other direction from a driving position.

To employ a sliding clutch satisfies the legal requirement with regard to the protection of objects impacting upon the mirror and enables an exact adjusting of the manual adjusting force of the mirror frame.

In combination with dimensioning of the electric motor and the sliding clutch, it can be achieved that the drive is able to move the mirror frame under its own power merely between the two predetermined positions, wherein the drive is respectively self-disengaging by means of an overload release, for example, with reaching the two positions by virtue of the resistance, which the locking in the driving position or the mirror foot in the parking position resist to the motion in these two positions.

A particularly advantageous embodiment of such a locking device comprises a hooked spring fastened to the mirror frame, which encompasses the second rotational axis. When the locking device engages, so the mirror position is uniquely related between the two predetermined positions of the toothed wheel position on the toothed quadrant.

An additional biased clock spring forcing the mirror head to the mirror frame reduces possible vibrations of the mirror head in particular with mirror heads being manually actuated.

BRIEF DESCRIPTION OF THE DRAWINGS

Hereinafter an exemplary embodiment of the device according to the invention will be described, in which FIG. 1 to FIG. 4 shows a device according to the invention in different positions of the mirror frame.

DETAILED DESCRIPTION OF THE INVENTION

Figure 1:
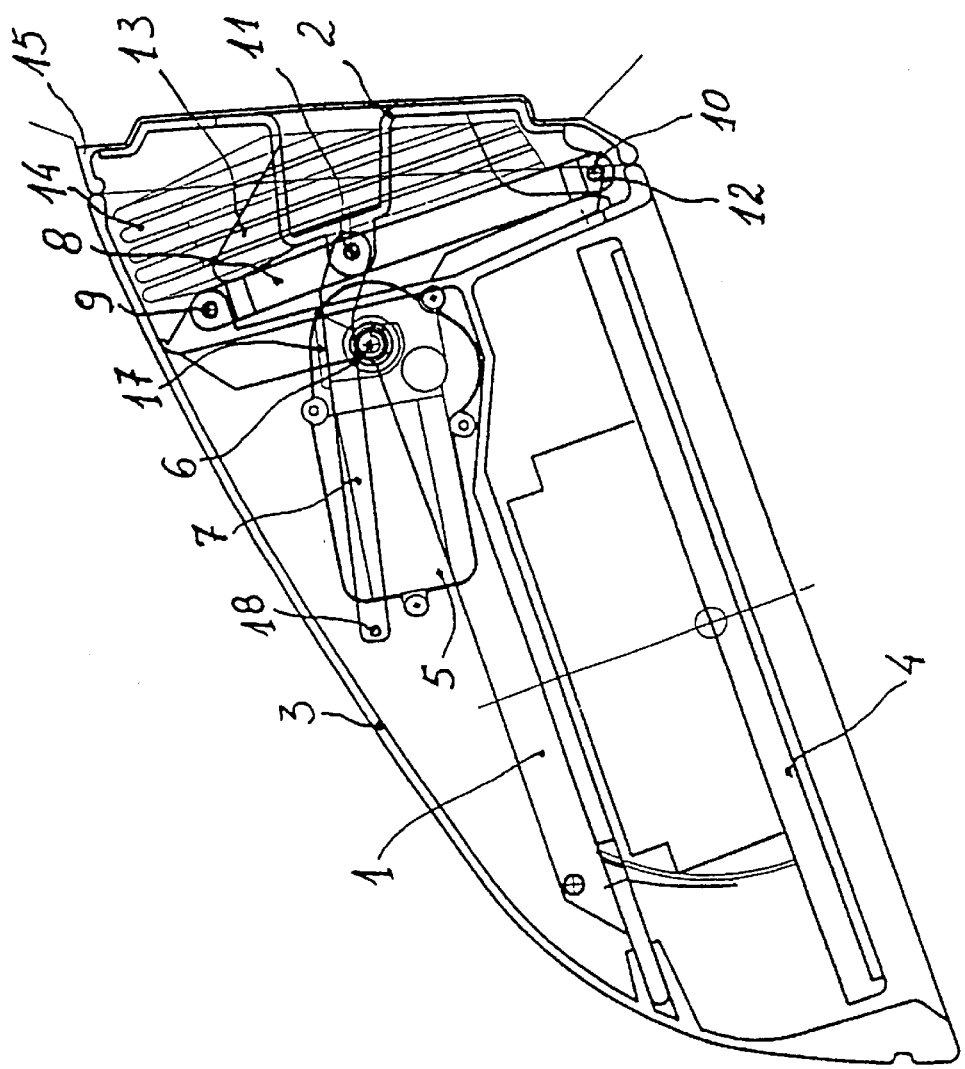

FIG. 1 shows a side mirror according to the invention in the driving position. The side mirror comprises a mirror foot 2 and a mirror head, wherein the mirror head inter alia includes a mirror frame 1 and a covering 3 fastened to the mirror frame 1 as well as a mirror surface member 4. The mirror frame 1 is designed to be fixed to an electric motor 5, which drives a toothed wheel 6 via an output shaft. The toothed wheel 6 engages a toothed rack 7, which in turn is rotatably articulated to the mirror foot 2. The toothed rack 7 is encompassed of a guiding member 17 and comprises an end stop 18.

Furthermore, the mirror frame 1 is connected to the mirror foot 2 via an intermediate joint 8, wherein the intermediate joint 8 is articulated about a rotational axis 9 to the mirror frame as well as about a second axis 10 to the mirror foot 2.

Furthermore, a hooked spring 12 is fastened to the mirror frame 1, which encompasses the second rotational axis 10 being locked with the mirror foot 2.

In the parking or driving positions the inner space of the mirror is protected against external influences by means of the sealing elements 14 and 15.

The mirror head further comprises a stop 13, against which the intermediate joint abuts in the driving position of the mirror head. In this driving position the toothed wheel 6 is upon the toothed rack 7 in a position comprising the lowest possible distance of the toothed wheel relative to the mirror foot 2.

Figure 2:
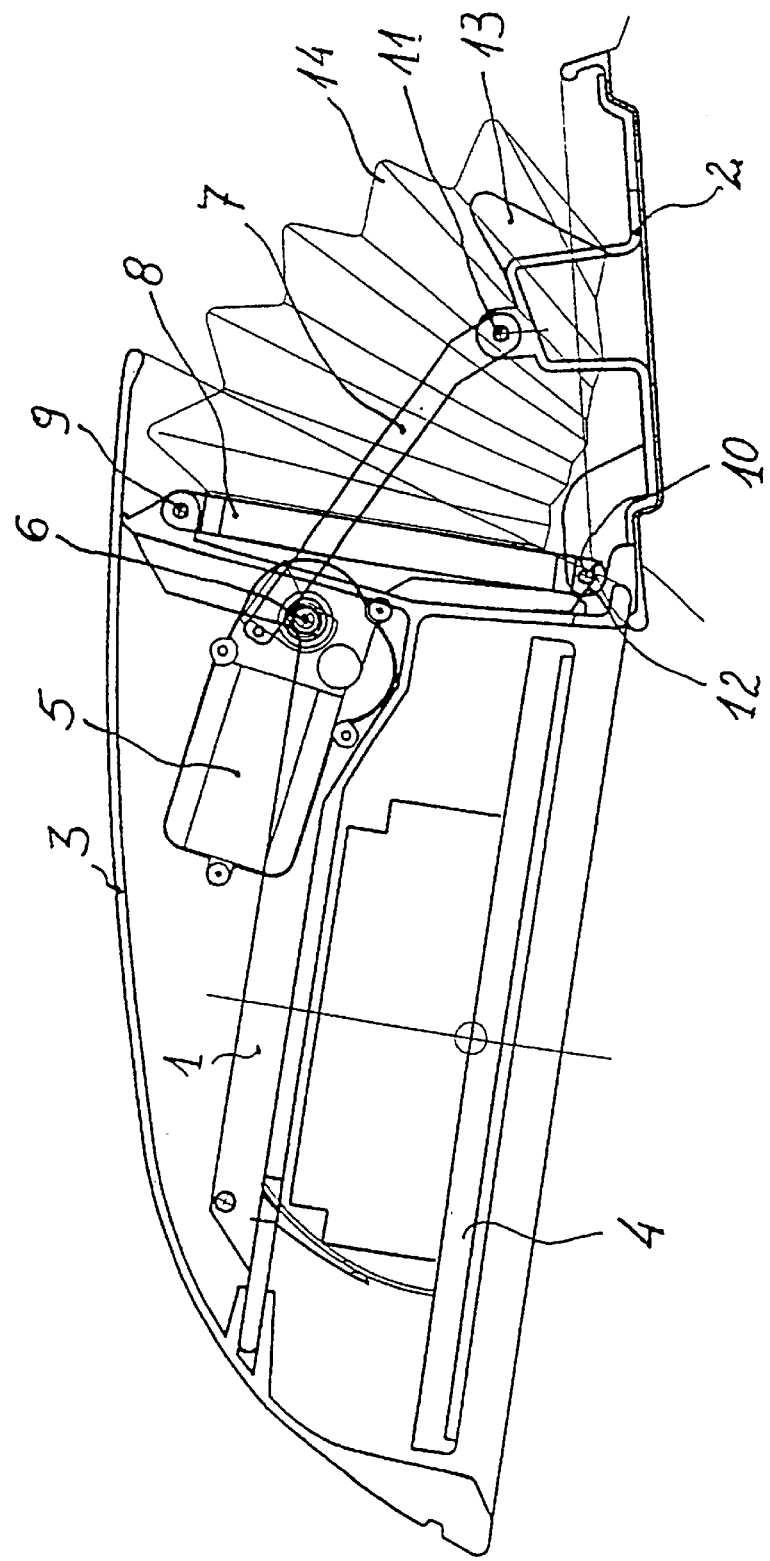

FIG. 2 illustrates the same mirror as FIG. 1 in the so called parking position, in which the mirror surface 4 is abutted particularly close against the vehicle. In FIG. 1 to 4 the same numerals indicate the same structural members.

For the so called parking position is characterizing, that the hooked spring 12 is locked with the second rotational axis 10, wherein the toothed wheel 6 is simultaneously in a position, which has the greatest distance from the mirror foot 2 along the toothed rack 7.

Figure 3:
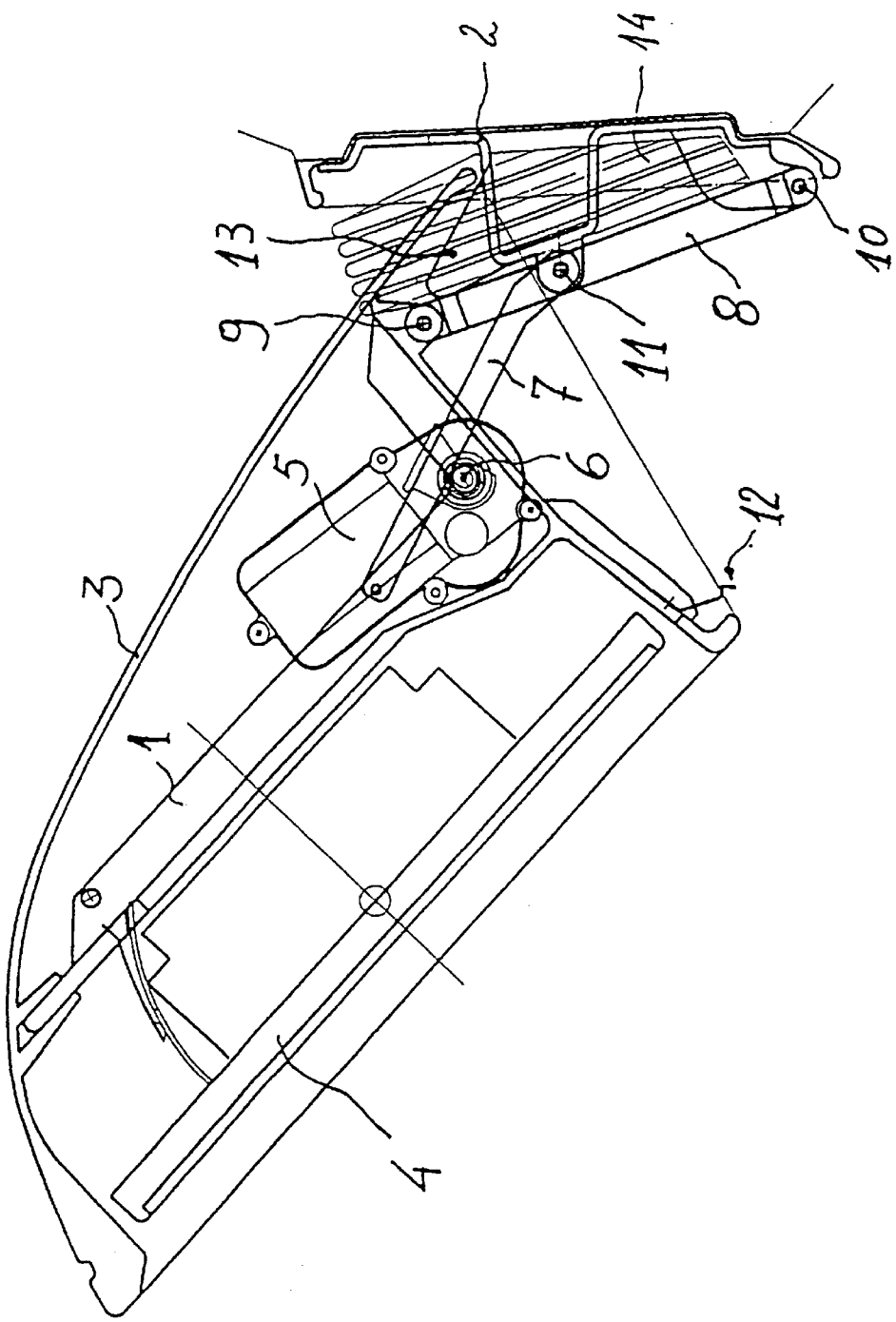
Figure 4:
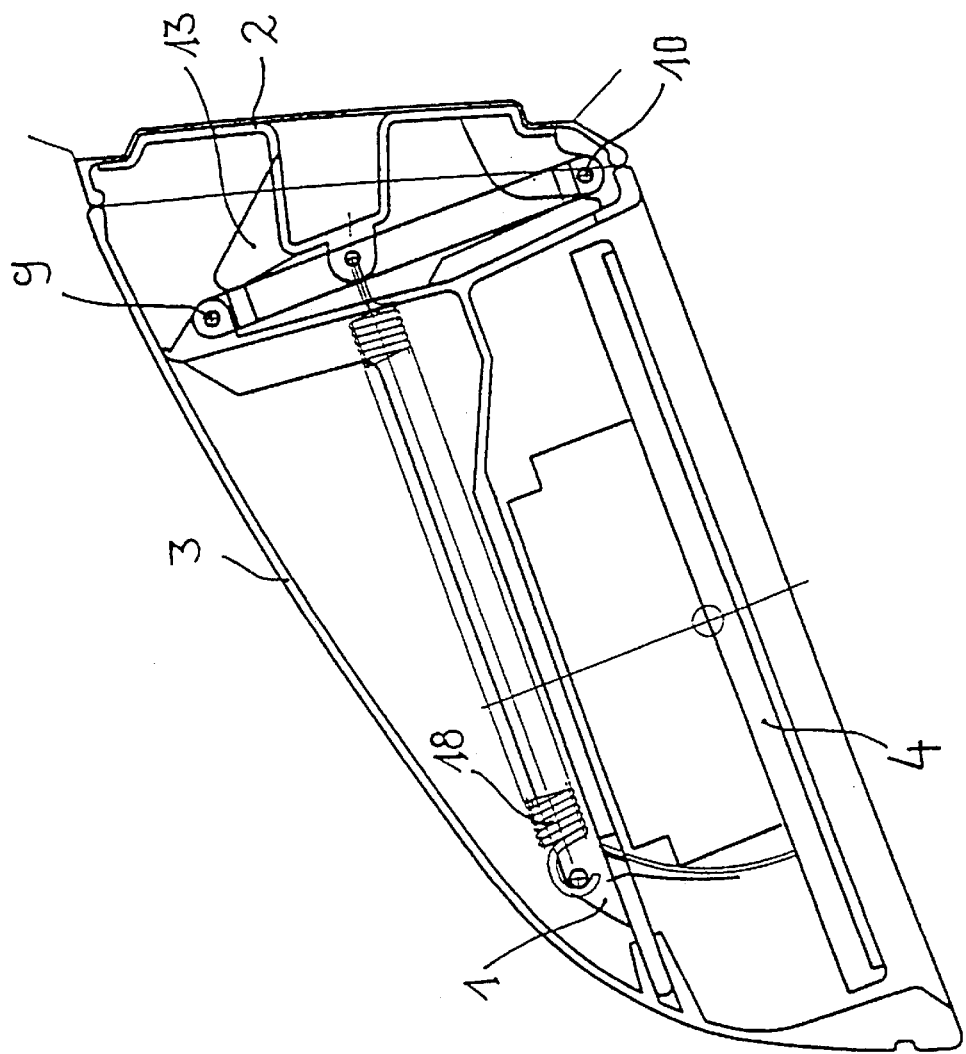

FIG. 3 illustrates the mirror of FIG. 1 and FIG. 2 in an overstretched position, into which the mirror can be brought such as by an external mechanical effect in the driving direction of the vehicle. In this position as well as with the parking position, the toothed wheel 6 is in a position being possibly remote from the mirror foot along the toothed rack 7. In contrast to the parking position, however, in this overstretched position the hooked spring 12 is unlocked from the second rotational axis 10.

The mirror can be moved back from the overstretched position in FIG. 3 into the driving position as shown in FIG. 1, seesawing the toothed wheel driven by means of the drive 5 upon the toothed rack 7 towards the mirror foot 2, until the hooked spring 12 locks again into the second rotational axis 10. When the toothed wheel subsequently runs again on the toothed rack 7 off of the mirror foot 2, such that a rotation of the mirror head about the second rotational axis 10 into the parking position takes place as shown in FIG. 2. In similar manner, the mirror can be brought again by means of the drive from the parking position into the driving position, by seesawing of the toothed wheel 6 driven by the drive 5 on the toothed rack 7 towards the mirror foot.

However, the drive 5 is dimensioned in a manner, that it is not capable to release a locking of the hooked spring 12 about the second rotational axis 10, such that the mirror head remains in the parking position. In this case the drive 5 is protected from overloading by an overload release.

A stop means 13 is mounted to the mirror foot 2, against which the intermediate joint 8 abuts in the driving position. For the overstretched position and parking position respectively a stop can also be provided, so that the mirror head remains in a predetermined position. Certainly, it is also possible to use the vehicle itself or the mirror foot 2 respectively as a stop for the parking or overstretched positions.

In FIG. 1 to FIG. 3 the mentioned overload release as well as a sliding clutch are not shown, which enables the toothed wheel 6 to seesaw upon the toothed rack 7 with the action of external forces, without the electric drive 5 being moved. Via this sliding clutch, in particular, this force is adjustable, which is required for manually adjusting the mirror head.

Another possibility is in that to withdraw from the drive 5, in order to realize a simple conventional manual side mirror. According to FIG. 4 a biased flat spiral spring 18 forcing the mirror head against the mirror foot 2 can be provided between the mirror foot 2 and the mirror frame 1. Therefore it is advantageous, that the same mirror foot 2 and the same mirror frame 1 can be used for the simple conventional side mirror as well as for the side mirror equipped with a drive 5.

What is claimed is:

1. A device for adjusting the position of a side mirror on a vehicle comprising:
    a mirror foot adapted to be fixedly attached to the vehicle;
    a mirror head having a mirror frame supporting a mirror surface member housed within a covering; and
    an intermediate joint abutting between said mirror foot and said mirror frame in a driving position and extending longitudinally between a first end articulated to a first rotational axis rotatably interconnecting said mirror frame and said intermediate joint for rotating said mirror head from said driving position to an overstretched position with said mirror frame spaced from said intermediate joint and a second end articulated to a second rotational axis rotatably interconnecting said mirror foot and said intermediate joint for rotating said mirror head from said driving position to a parking position with said intermediate joint spaced from said mirror foot.

2. A device as set forth in claim 1 further including a locking device operably coupled between said mirror frame and said intermediate joint for releasably locking said device in said driving position.

3. A device as set forth in claim 2 wherein said locking device comprises a hooked spring which encompasses said second rotational axis of said intermediate joint as a locking projection to said mirror frame to said second rotational axis.

4. A device as set forth inc claim 1 further including a biasing member interconnected between said mirror head and said intermediate joint generally midway between said first and second ends for biasing said device in said driving position.

5. A device as set forth in claim 1 further including a toothed wheel mechanism having a toothed wheel engaged with a toothed quadrant, which is articulated to an intermediate rotational rotatably coupled on said mirror foot for guiding said mirror head between said driving, parking overstretched positions.

6. A device as set forth in claim 5 further including a drive fixedly supported by said mirror frame and operatively coupled to said toothed wheel for driving said wheel along said toothed quadrant to articulate said mirror head between said driving position and said parking position.

* * * * *

UNITED STATES PATENT AND TRADEMARK OFFICE
CERTIFICATE OF CORRECTION

PATENT NO. : 6,412,963 B1
DATED : July 2, 2002
INVENTOR(S) : Juraschek

It is certified that error appears in the above-identified patent and that said Letters Patent is hereby corrected as shown below:

Column 2,
Line 43, delete "is" and insert -- are --.

Column 6,
Line 4, insert -- axis -- to read -- rotational axis rotatably coupled --.
Lines 5-6, insert -- and -- to read -- parking and overstretched positions --.

Signed and Sealed this

Twelfth Day of November, 2002

*Attest:*

*Attesting Officer*

JAMES E. ROGAN
*Director of the United States Patent and Trademark Office*